United States Patent
Harris

(10) Patent No.: US 11,156,307 B2
(45) Date of Patent: Oct. 26, 2021

(54) FAILSAFE VALVE ACTUATOR

(71) Applicant: BIFOLD FLUIDPOWER LIMITED, Chadderton (GB)

(72) Inventor: Robert Graham Harris, Crickhowell Powys (GB)

(73) Assignee: Bifold Fluidpower Limited

( * ) Notice: Subject to any disclaimer, the term of this patent is extended or adjusted under 35 U.S.C. 154(b) by 16 days.

(21) Appl. No.: 16/630,944

(22) PCT Filed: Jul. 6, 2018

(86) PCT No.: PCT/GB2018/051930
§ 371 (c)(1),
(2) Date: Jan. 14, 2020

(87) PCT Pub. No.: WO2019/012256
PCT Pub. Date: Jan. 17, 2019

(65) Prior Publication Data
US 2020/0224785 A1 Jul. 16, 2020

(30) Foreign Application Priority Data
Jul. 14, 2017 (GB) ..................................... 1711388

(51) Int. Cl.
*F16K 31/04* (2006.01)
*F16K 37/00* (2006.01)
(Continued)

(52) U.S. Cl.
CPC ........ *F16K 31/047* (2013.01); *F16K 37/0041* (2013.01); *F16D 2023/123* (2013.01);
(Continued)

(58) Field of Classification Search
CPC .... F16K 31/047; F16K 31/046; F16K 31/508; F16K 31/56; F16K 37/0041; F16D 2023/123; F16H 25/2025
See application file for complete search history.

(56) References Cited

U.S. PATENT DOCUMENTS 2,276,195 A  3/1942 Holmes
3,252,684 A * 5/1966 Ksieski ................. F16K 5/0668
251/172
(Continued)

FOREIGN PATENT DOCUMENTS

CA    2122096 A1   10/1994
CN   105351602 A    2/2016
(Continued)

OTHER PUBLICATIONS

International Search Report of PCT/GB2018-051930 dated Aug. 28, 2018.
(Continued)

Primary Examiner — Eric Keasel
(74) Attorney, Agent, or Firm — Polsinelli PC

(57) ABSTRACT

The present invention relates to a failsafe valve actuator (10) comprising a drive mechanism (12), a drive shaft (42) having a clutch (50) arranged adjacent to a threaded portion (44) of the drive shaft (42), and a clutch actuator (52) coupled to the clutch (50) and arranged to move the clutch (50) between an engaged position in which the clutch (50) engages with the threaded portion (44) of the drive shaft (42) and a disengaged position in which the clutch (50) is disengaged from the drive shaft (42). In response to energisation of the clutch actuator (52) the clutch (50) is moved to the engaged position such that threaded engagement between the drive shaft (42) and clutch (50) transfers rotational movement of the drive shaft (42) by the drive mechanism (12) into axial movement of the drive shaft (42) and
(Continued)

holds the drive shaft (42) against a drive shaft bias member when the drive mechanism is inactive. Movement of the clutch (50) to the disengaged position, causes the drive (12) shaft bias member to automatically return the drive shaft (42) to the failsafe position.

15 Claims, 9 Drawing Sheets

(51) Int. Cl.
  *F16D 23/12* (2006.01)
  *F16H 25/20* (2006.01)
  *F16K 31/50* (2006.01)
  *F16K 31/56* (2006.01)
(52) U.S. Cl.
  CPC ........ *F16H 25/2025* (2013.01); *F16K 31/046* (2013.01); *F16K 31/508* (2013.01); *F16K 31/56* (2013.01)

(56) References Cited

U.S. PATENT DOCUMENTS

| | | | |
|---|---|---|---|
| 3,856,421 A | 12/1974 | Nogler | |
| 4,340,086 A | 7/1982 | Hemm et al. | |
| 4,920,816 A * | 5/1990 | Inabe | B60K 31/02 192/93 C |
| 5,735,456 A * | 4/1998 | Marin | F16K 31/046 236/75 |
| 8,979,063 B2 * | 3/2015 | Schade | F16K 31/047 251/69 |
| 2014/0306134 A1 | 10/2014 | Phonix | |
| 2016/0377126 A1 | 12/2016 | Essenmacher | |

FOREIGN PATENT DOCUMENTS

| | | |
|---|---|---|
| DE | 102012020067 A1 | 4/2014 |
| EP | 1437529 A2 | 7/2004 |
| EP | 2186540 A1 | 5/2010 |
| GB | 2442597 A | 4/2011 |
| JP | H03 247347 A | 11/1991 |
| WO | 2010/050609 A1 | 5/2010 |

OTHER PUBLICATIONS

Search Report of Great Britain Application No. GB1711388.7 dated Jan. 9, 2018.
Written Opinion of PCT/GB2018-051930 dated Aug. 28, 2018.

* cited by examiner

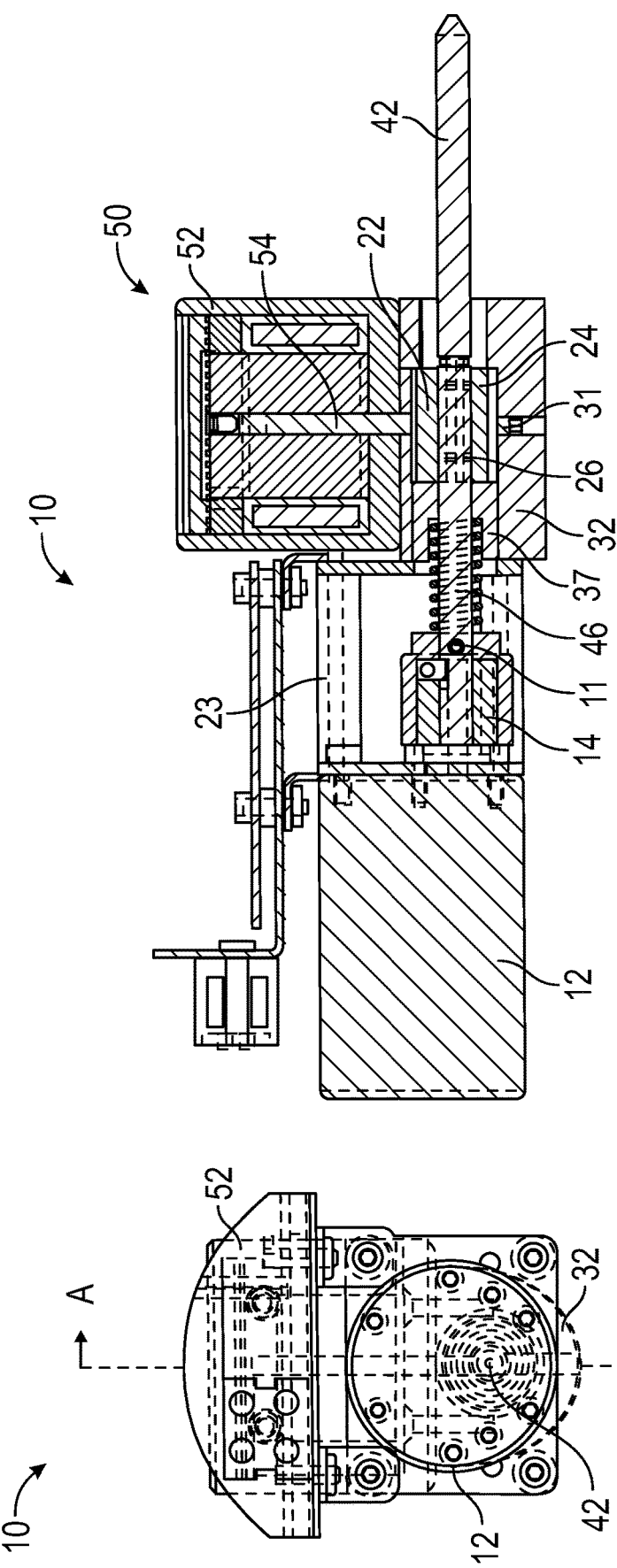

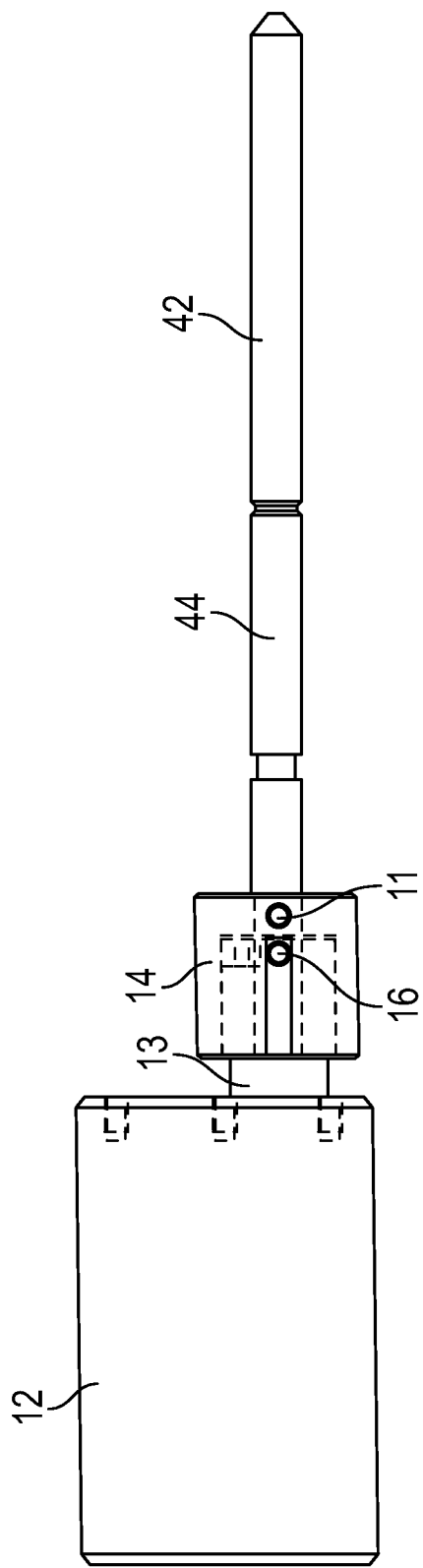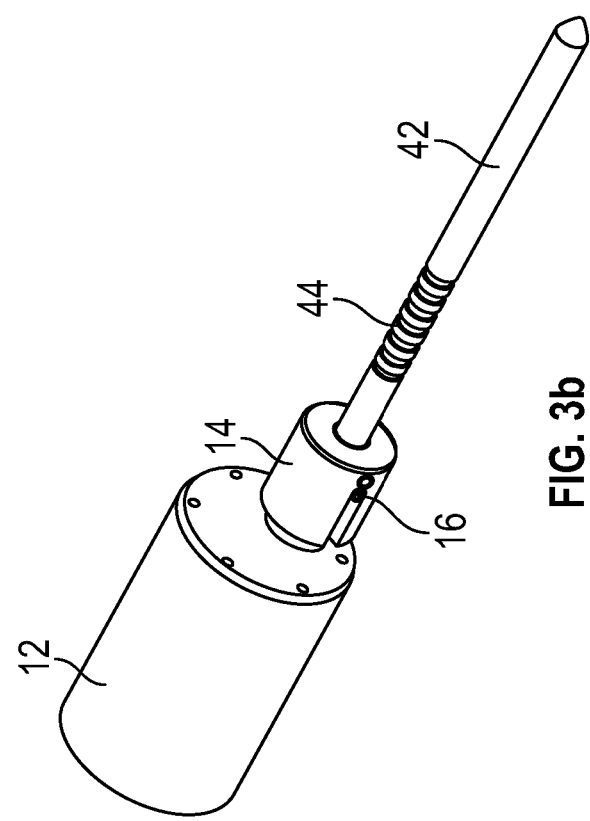
FIG. 3a
FIG. 3b

FAILSAFE VALVE ACTUATOR

CROSS-REFERENCE TO RELATED APPLICATIONS

This application is a U.S. National Stage Application of International Application No. PCT/GB2018/051930, filed Jul. 6, 2018, which claims priority from GB Patent Application No. 1711388.7, filed Jul. 14, 2017, the entire contents of which are hereby incorporated by reference in their entirety.

FIELD OF INVENTION

This invention relates to a failsafe valve actuator, such actuators are arranged to automatically return a valve to a failsafe position. The invention further relates to a valve apparatus comprising a valve and said valve actuator.

BACKGROUND OF THE INVENTION

Valve actuators are typically used to control the flow of fluid through a valve. They are widely utilised in many industries for opening and closing a valve, or even for moving a valve to an intermediate position to restrict, but not prevent, fluid flow. They can be manually actuated, such as by a hand wheel; or they can be powered. Powered, or automated, valve actuators can be, for example, hydraulic, pneumatic or electric. Electrically powered valve actuators typically comprise an electric motor.

Some manually operable and automated valve actuators work by driving a shaft in a forward direction to, for example, open the valve; and then driving the shaft in the reverse direction to, for example, close the valve. Such a mechanism is not failsafe however since the shaft needs to be driven in the reverse direction. Such arrangements may not be suitable for applications which require fast shut down of the systems to revert the apparatus to a safe condition.

It is, therefore, known to provide a failsafe-valve actuator which in addition to allowing positioning of the valve during use includes features automatically returning a valve to a failsafe position. For example, some known automated/powered valve actuators comprise a biasing mechanism, such as a spring, to bias the shaft and the valve into one of the open and closed positions. In use, the valve is moved by the actuator into the non-biased position via an application of a force against the bias. The biased position is typically the failsafe position. When power is removed from the actuator (either intentionally or through an interruption or loss of supply), the valve automatically moves into the failsafe position, as the applied force against the bias is removed allowing the valve to automatically return to the biased position. For example, in some applications, such as subsurface fluid flow, it is desirable to bias the valve into the closed position such that the flow of fluid (e.g., hydrocarbons) can be automatically stopped if an emergency situation arises, for example to prevent a potential blow-out. The same principles apply in any industry where fluid flow needs to be controlled.

The problem with known valve actuators that operate with a biasing mechanism is that the power source has to provide the required force to not only move the valve against the biasing mechanism, but to also hold the valve in that position against the biasing mechanism until the power is turned off/lost. This may require an excessive amount of energy such that the valve actuator is not very efficient. Furthermore, holding the valve against the biasing mechanism can for example increase the risk of burning out a motor (in an electrically driven system) due to the amount of current drawn.

It is therefore an object of embodiments of the present invention to provide a valve actuator which reduces the operating power required whilst continuing to provide an efficient and automatic failsafe mechanism.

SUMMARY OF THE INVENTION

Accordingly, in one aspect, the present invention provides a failsafe valve actuator, the valve actuator comprising:
 a drive mechanism;
 a drive shaft:
 comprising an externally threaded portion extending along at least a portion of the length of the drive shaft,
 the drive shaft being coupled to the drive mechanism, such that the drive shaft is rotatable by the drive mechanism when the drive mechanism is energised, and wherein
 the drive shaft is further axially moveable between a retracted position and an extended position;
 a drive shaft bias member arranged to axially bias the drive shaft into a failsafe position;
 a clutch arranged adjacent to the threaded portion of the drive shaft; and comprising at least a partial internal thread complementary to the external thread of the drive shaft,
 a clutch actuator coupled to the clutch and arranged to move the clutch between an engaged position in which the clutch engages with the threaded portion of the drive shaft and a disengaged position in which the clutch is disengaged from the drive shaft;
 wherein in response to energisation of the clutch actuator the clutch is moved to the engaged position such that threaded engagement between the thread of the drive shaft and clutch transfers rotational movement of the drive shaft by the drive mechanism into axial movement of the drive shaft and holds the drive shaft against the drive shaft bias member when the drive mechanism is inactive; and
 wherein movement of the clutch to the disengaged position, causes the drive shaft bias member to automatically return the drive shaft to the failsafe position.

It will be appreciated that the term "failsafe valve actuator" as used herein refers to a valve actuator which can both provide a positioning force to a valve and enables automatic return of the valve to a failsafe position. Moreover, the term "axial" as used herein refers to movement parallel to the axial direction of the drive shaft.

The valve may be moveable between a closed position and an open position. When in the closed position, the valve prevents the flow of fluid through the valve; whereas when in the open position, the valve permits the flow of fluid through the valve. The valve may also be moveable to an intermediate position where the flow of fluid through the valve is somewhat restricted, but not prevented.

The failsafe position may correspond to the closed position of the valve. Although in some embodiments, it is conceivable that the failsafe position may correspond to the open position of the valve.

In some embodiments, the drive shaft may be moveable from its retracted position to its extended position in response to energisation of the clutch actuator. This may be referred to as a "push-type" actuator. The extended position of the drive shaft may correspond to the open position of the valve; where the retracted position may correspond to the closed, or failsafe, position of the valve.

Alternatively, the actuator may be a "pull-type" actuator, whereby the drive shaft may be moveable from its extended position to its retracted position in response to energisation of the clutch actuator. In a "pull-type" actuator, the drive shaft may be connected to the valve. The extended position of the drive shaft may correspond to the closed, or failsafe, position of the valve; where the retracted position may correspond to the open position of the valve.

The drive shaft may be driven rotationally with resultant axial movement (for example to the extended position, or alternatively to the retracted position) in response to the threaded engagement between the thread of the drive shaft and the clutch.

Movement of the clutch to the disengaged position may be the result of de-energising of the clutch actuator. The drive shaft may be axially moveable from the extended to the retracted position in response to the de-energisation of the clutch actuator in the "push-type" actuator; or from the retracted to the extended position in the "pull-type" actuator. When the clutch actuator is de-energised, the threads of the drive shaft and the clutch are disengaged. The disengagement of the threads removes the hold against the biasing member. The drive shaft may therefore automatically and immediately be returned to the failsafe position. Hence, the drive shaft does not need to be driven into the failsafe position, which typically corresponds to the closed position of the valve. It may be an advantage of embodiments of the present invention that the drive shaft is automatically and immediately returned to the failsafe position, and not driven back to the failsafe position, because this allows the valve to be moved into the failsafe position quicker when, for example, an emergency shut down of the system is required.

The clutch actuator may be de-energised by loss of power to the clutch actuator. The loss of power may be automatic in response to the detection of a potentially hazardous situation. Alternatively the power to the clutch actuator may be turned off manually.

The clutch may comprise a body defining a partial segment of internal thread corresponding to the thread of the drive shaft. The clutch may be positioned concentrically around at least a portion of the drive shaft.

In an exemplary embodiment, the clutch may comprise first and second shells with a substantially semi-circular or arch shaped cross-section. The first and second shells may be concentrically arranged around the at least a portion of the externally threaded portion of the drive shaft. The first shell may have a smooth inner surface proximal to the drive shaft. The second shell may comprise the partial segment of said internal thread defined by a threaded portion on the inner surface.

The clutch actuator may be arranged to move the second shell into engagement with the at least a portion of the externally threaded portion of the drive shaft in response to energisation of the clutch actuator, such that the threaded portion of the second shell engages with the threaded portion on the drive shaft to cause the drive shaft to be moved axially from one of the retracted and extended position to the other of the retracted and extended position, depending on if the actuator is a "push-type" or a "pull-type" actuator.

The threaded portion of the second shell may be any suitable thread, and the threaded portion of the drive shaft may be any suitable corresponding thread. The threaded portion of the second shell may be a buttress or trapezoidal thread. The threaded portion of the drive shaft may be a complementary buttress or trapezoidal thread. For very high levels of axial load, the threaded portion of the second shell may require a different form to hold engagement, but this does not affect the operating principle. It may be an advantage of embodiments of the present invention that the angular surface of the buttress or trapezoidal threads require less radial load to engage with the drive shaft compared to standard metric threads, and consequently require a smaller solenoid force for engagement. Furthermore, such angular surfaces are also easier to disengage from the drive shaft, since they require a smaller separation force between the first and second shells for disengagement. The external diameter of the second shell may be smaller than the external diameter of the first shell. It may be an advantage of embodiments of the present invention that a smaller second shell provides the required radial clearance to allow the second shell to disengage from the drive shaft. The threads on the threaded portion of the second shell may extend only partially around the inner surface. The inner diameter of the first shell may be approximately equal to the major diameter of the threaded portion extending along at least a portion of the length of the drive shaft.

The first and second shells may be separated by a clutch bias member. The clutch bias member may comprise at least one spring located in corresponding spring pockets in at least one of the first and second shells.

In an alternative embodiment, the clutch may comprise a collet arrangement which closes on the threaded portion extending along at least a portion of the length of the drive shaft when the clutch actuator is energised.

The clutch bias member may assist, in use, the separation of the first and second shells. This may help to ensure that the threaded portion of the second shell fully disengages with the threaded portion of the drive shaft, to allow the drive shaft to be moved automatically and immediately into the failsafe position.

The clutch actuator may be arranged to move the second shell into engagement with the drive shaft against the clutch bias member.

The drive shaft bias member may comprise at least one spring arranged to automatically return the drive shaft to one of the retracted and extended position when the clutch disengages from the drive shaft, depending on if the actuator is a "push-type" or a "pull-type".

The clutch actuator may comprise a solenoid having a plunger. The plunger may be linearly moveable to move the clutch into engagement with the drive shaft in response to energisation of the solenoid. The solenoid and plunger may act in a direction substantially perpendicular to the axial direction of the drive shaft.

The drive mechanism may be automatically de-energised and the drive shaft may be held in one of the retracted and extended position (depending on if the actuator is a "push-type" or a "pull-type") against the drive shaft bias member by the clutch after one or more of: a pre-determined length of operating time; a position sensor indicating that the full stroke of the drive shaft has been reached; a sensor measuring the current and indicating that a pre-determined current limit has been reached.

In an exemplary embodiment, the drive mechanism comprises an electrical motor. The motor may be driven through an adjustable current limited supply, such that when a pre-determined current limit is reached, the motor automatically de-energises and the drive shaft is held in one of the retracted and extended position (depending on if the actuator is a "push-type" or a "pull-type") by the clutch against the drive shaft bias member. The pre-determined current limit may therefore be indicative of the valve being at the end of its range of motion (i.e. in a fully open or fully closed position).

The valve actuator may further comprise a drive pin and a sliding coupling for engagement between the drive mechanism and the drive shaft. Such an arrangement allows the drive mechanism to rotate the drive shaft and the drive shaft to move axially relative to the drive mechanism. Alternatively, the drive mechanism may comprise a parallel spline gear arrangement.

The clutch actuator typically requires significantly less power to hold the drive shaft in one of the retracted and extended position (depending on if the actuator is a "push-type" or a "pull-type") by the clutch compared to the amount of power which would be required to hold the drive shaft in the same position through operation of the drive mechanism. It may be an advantage of embodiments of the present invention that the clutch requires less power than the drive mechanism to hold the drive shaft in one of the retracted or extended position. This can result in much lower power consumption and more efficient operation compared to known valve actuators with failsafe provisions.

In a second aspect, the present invention provides a valve apparatus comprising a valve and a valve actuator as substantially described herein.

It is envisaged that the valve actuator as described herein may have application in a wide range of technical fields. This may extend to, but is not limited to, industrial applications in oil & gas, such as subsea or subsurface, door interlock systems and positioners; and also domestic applications such as in heating systems, such as central heating, and domestic supplies, such as gas supplies.

Whilst the invention has been described above, it extends to any inventive combination set out above, or in the following description or drawings.

BRIEF DESCRIPTION OF THE DRAWINGS

The invention may be performed in various ways, and an embodiment thereof will now be described by way of example only, reference being made to the accompanying drawings, in which:

FIGS. 2a and 2b show an end view of the valve actuator and a side view of the valve actuator through section A-A of FIG. 2a;

FIGS. 3a and 3b show a side view and a perspective view of the motor coupled to the drive shaft in accordance with embodiments of the present invention;

DETAILED DESCRIPTION OF EMBODIMENTS

Figure 1:
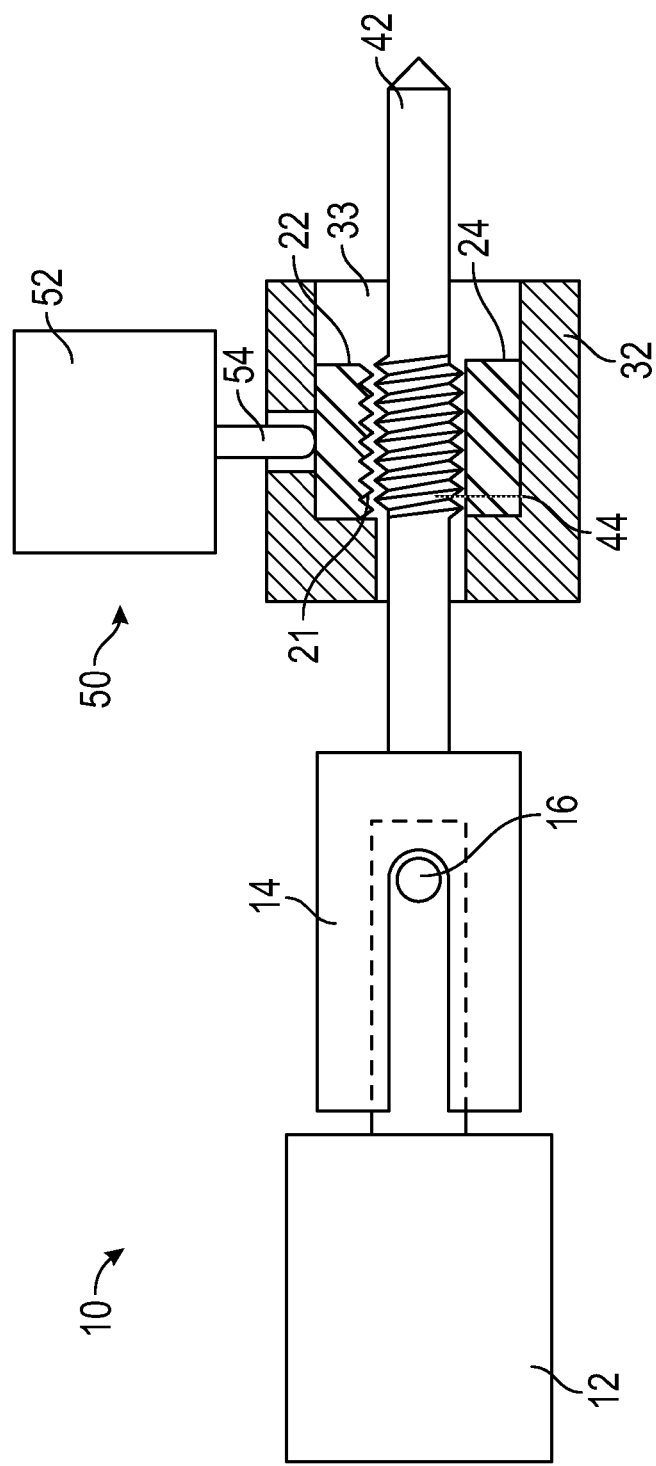
FIG. 1 is a schematic side view of a valve actuator in accordance with embodiments of the present invention.

FIGS. 1, 2a and 2b show a "push-type" failsafe valve actuator 10 for actuating a valve (not shown) and automatically returning the valve to a failsafe position. The valve actuator 10 comprises a drive mechanism in the form of an electric motor 12, and a drive shaft 42. In use the output of the drive shaft 42 is operationally coupled to the input of a valve, for example to a valve stem. As will be described further below, the electric motor 12 and the drive shaft 42 are coupled via a drive pin 16 and a sliding coupling 14. The drive shaft 42 is attached to the sliding coupling 14 via a pin 11, and is rotatable by the motor 12 when the motor is energised.

The drive shaft 42 comprises an externally threaded portion 44 extending along a portion of the length of the drive shaft 42. A clutch 50 comprises a clutch body 32 and two half shells 22, 24 arranged around the threaded portion 44 of the drive shaft 42 and within a passage 33 extending through the inside of the clutch body 32. As will be described in more detail below, the clutch 50 comprises an upper shell 22 and a lower shell 24. The upper shell 22 comprises a partial internal thread 21 which is aligned with and is complementary to the externally threaded portion 44 of the drive shaft 42.

Figure 4C:
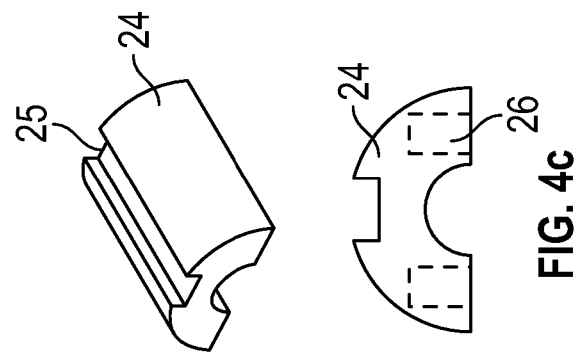
FIGS. 4a, 4b, and 4c show various views of the clutch of the valve actuator in accordance with embodiments of the present invention.

As will be better demonstrated in FIG. 4c, passage 33 through the clutch body 32 comprises a first portion 33a with a first diameter and a second portion 33b with a second diameter, with the first diameter being larger than the second diameter. The first portion 33b comprises the half shells 22, 24. The half shells 22, 24 are located at the divide between the first and second portions 33a, 33b, and are held in this position by a clutch spacer 37. The clutch body 32 is fixed in position in relation to the motor 12. The lower shell 24 is additionally held in the correct position flush against the drive shaft 42 by a blind set screw or grub screw 31.

The clutch 50 also comprises a clutch actuator 52, which in this example is a solenoid, and also a plunger rod 54. The solenoid 52 is coupled to the half shells 22, 24 via plunger rod 54, and is arranged to move the upper shell 22 between an engaged position in which the upper shell 22 engages with the externally threaded portion 44 of the drive shaft 42, and a disengaged position in which the upper shell 22 is disengaged from the drive shaft 42.

As shown in FIG. 2a, the motor 12 is spaced apart from the clutch 50 by spacers 23. The spacers 23 help to keep the solenoid 50 at the right distance from the motor 12 such that the partial internal thread 21 of the upper shell 22 is appropriately aligned with the externally threaded portion 44 of the drive shaft 42. Alternatively, or additionally, the attachment point between the drive shaft 42 and the sliding coupling 14 (via pin 11) can be varied, thus varying the length of the drive shaft 42 extending away from the sliding coupling 14.

In use, when the internal thread 21 of the upper shell 22 engages with the externally threaded portion 44 of the drive shaft 42, the rotation of the drive shaft 42 is converted into axial movement, such that the drive shaft 42 moves from a retracted, or failsafe, position to an extended position (for a "push-type" actuator). A return spring 46 is positioned between the sliding coupling 14 and the clutch body 32. The return spring 46 biases the drive shaft 42 into the failsafe position.

The valve actuator 10 further comprises a printed circuit board (PCB) for controlling the operation of the actuator. The PCB carries the electronic components necessary for monitoring the motor current and controlling the motor and clutch power supplies.

Each of the components of the valve actuator 10 will now be described in more detail below.

FIGS. 3a and 3b show the motor 12 and the coupling between the motor 12 and the drive shaft 42 in more detail. The motor 12 comprises a motor shaft 13. The motor shaft 13 comprises the drive pin 16 which is designed to slide into a complementary slot on the sliding coupling 14. The sliding coupling 14 and the drive shaft 42 are also attached to each other via the pin 11 which extends through an end portion of the sliding coupling 14 and an end portion of the drive shaft 42. In use, when the drive pin 16 is located within the slot, the motor 12 and the drive shaft 42 are coupled, and the drive shaft 42 can rotate when the motor 12 is energised.

The slot is designed to be longer than the axial range of movement of the drive shaft 42. For example if the axial range of movement of the drive shaft is 5 mm, then the slot is designed to be, for example, 10 mm. This helps to prevent the sliding coupling 14 uncoupling from the motor 12 during operation of the valve actuator. FIG. 3b also shows the externally threaded portion 44 extending along a portion of the length of the drive shaft 42.

Figure 4B:
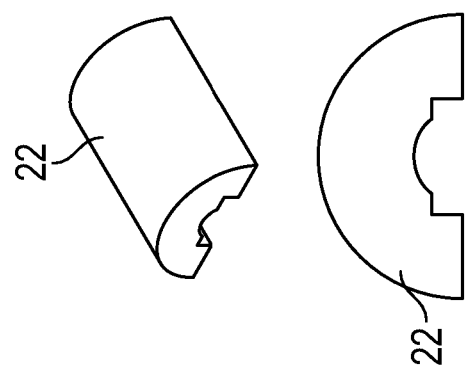
Figure 4A:
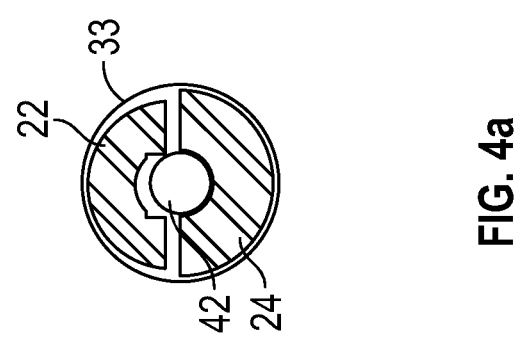

FIGS. 4a, b, and c show the two half shells 22, 24 of the clutch body 32. FIG. 4a shows an end view of the upper shell 22 and the lower shell 24 arranged within the passage 33 of the clutch body 32. The half shells 22, 24 are designed such that the drive shaft 42 passes through the centre of the passage 33, that is the half shells 22, 24 are concentrically arranged around the drive shaft 42. The external diameter of the upper shell 22 is smaller than the external diameter of the lower shell 24.

FIG. 4b shows in more detail the shape of the upper shell 22. A portion of the inner surface of the upper shell 22 is cut away in order to accommodate the drive shaft 42. The cut-away portion has a cross-section which is substantially rectangular in shape, with the long edge of the rectangle partially arched. In this example, the partially arched portion comprises the internal thread 21 (shown in FIG. 1). The remaining rectangular portions are not threaded. As will be described further below, this design assists with ensuring the upper shell 22 fully disengages from the externally threaded portion 44 of the drive shaft 42 such that the drive shaft 42 can be automatically and immediately returned to the failsafe position without hindrance.

FIG. 4c shows the bottom shell 24. As with the top shell 22, the inner surface of the bottom shell 24 has a portion cut away in order to accommodate the drive shaft 42. The cut-away portion of the lower shell 24 has a cross-section which is arch shaped, and it is not threaded. The inner diameter of the arch shaped inner surface is approximately equal to the major diameter of the externally threaded portion 44 of the drive shaft 42. In use, the bottom shell 24 is held flush against the major diameter of the externally threaded portion 44 of the drive shaft 42 by the grub screw 31.

The lower shell 24 also comprises spring pockets 26 (also shown in FIG. 2b). The spring pockets 26 are arranged to receive and hold springs. The springs bias the upper and lower shells 22, 24 into the disengaged position. The springs help to ensure the upper shell 22 fully disengages from the externally threaded portion 44 of the drive shaft 42 such that the drive shaft 42 can be automatically and immediately returned to the failsafe position without hindrance.

A groove 25 is located on the bottom shell 24. The groove 25 receives the grub screw 31 in use, to help prevent the bottom shell 24 rotating under load. It may be an advantage of embodiments of the present invention that bottom shell is prevented from rotating, otherwise any rotation could cause premature disengagement of the threaded upper shell.

Figure 5C:
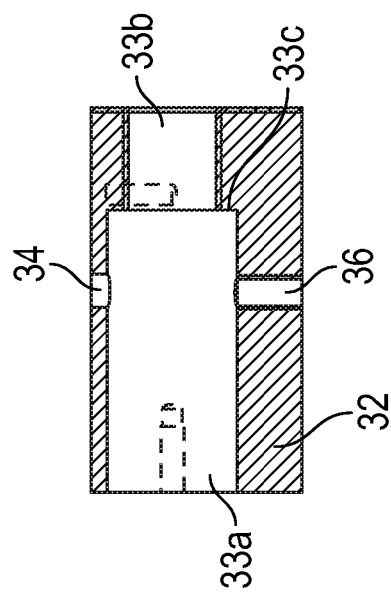
FIGS. 5a, 5b and 5c show a perspective view, an end view and a side view through section B-B of FIG. 5b of the clutch body of the valve actuator in accordance with embodiments of the present invention.
Figure 5B:
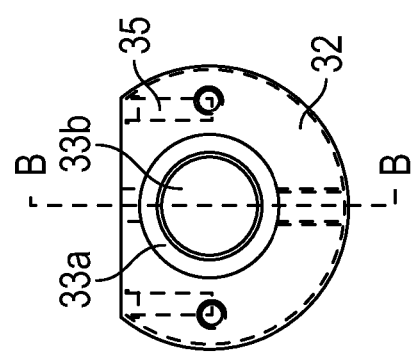
Figure 5A:
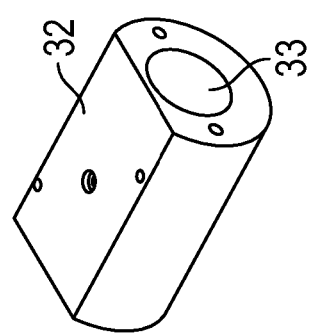

FIGS. 5a, b and c show the clutch body 32 in more detail. FIG. 5a shows a perspective view of the clutch body 32, and the passage 33 extending through the clutch body 32. The clutch body 32 is cylindrical but with a truncated circular cross-section. This provides a flat surface upon which the solenoid 52 is mounted in use. The solenoid 52 is mounted to the clutch body 32 using, for example, screws which fit into screw holes 35.

As discussed above, FIGS. 5b and 5c show the passage 33 comprising a first portion 33a with a first diameter and a second portion 33b with a second diameter, with the first diameter being larger than the second diameter. The first portion 33a in use comprises the half shells 22, 24 which are located at the divide 33c between the first portion 33a and the second portion 33b. Also in use, the drive shaft 42 extends through both the first portion 33a and the second portion 33b.

The clutch body 32 also comprises a first opening 34 and a second opening 36. The first opening 34 is arranged to receive the plunger rod 54 of the solenoid 52, so that it can contact the upper shell 22 in use. The second opening 36 is arranged to receive the grub screw 31 to help hold the lower shell 24 in position.

Figure 6B:
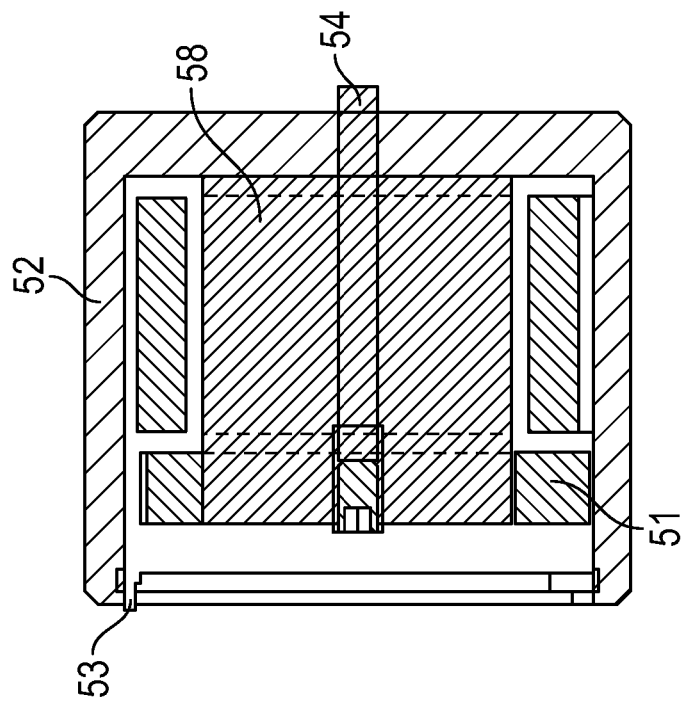
FIGS. 6a and 6b show a top view and a side view through section C-C of FIG. 6a, of the clutch actuator of the valve actuator in accordance with embodiments of the present invention.
Figure 6A:
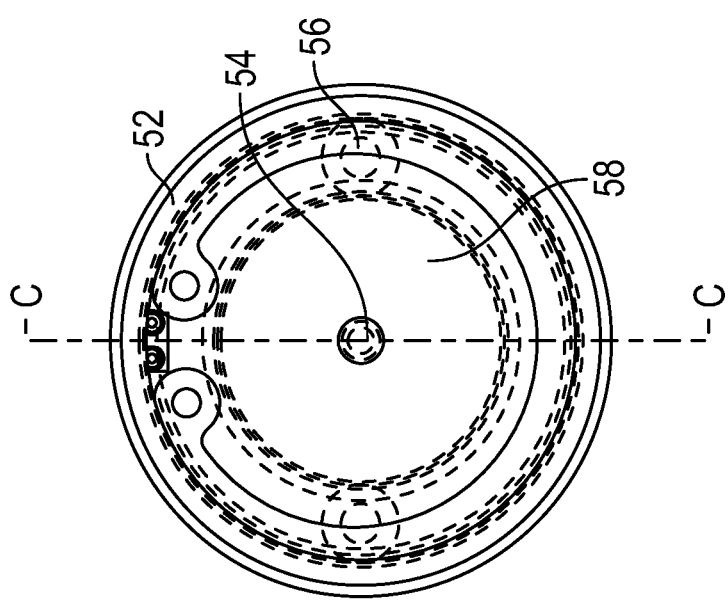

FIGS. 6a and 6b show the solenoid 52 and the solenoid plunger 54 in more detail. The solenoid 52 works in the same way as a conventional solenoid, and therefore the operation of the solenoid will not be described in detail here. The solenoid 52 is cylindrical in shape, and comprises an armature 58 which holds the solenoid plunger 54. Located around the armature 58 is a coil 53, and also a pole piece 51 which serves to direct/control the magnetic field.

Figure 7:
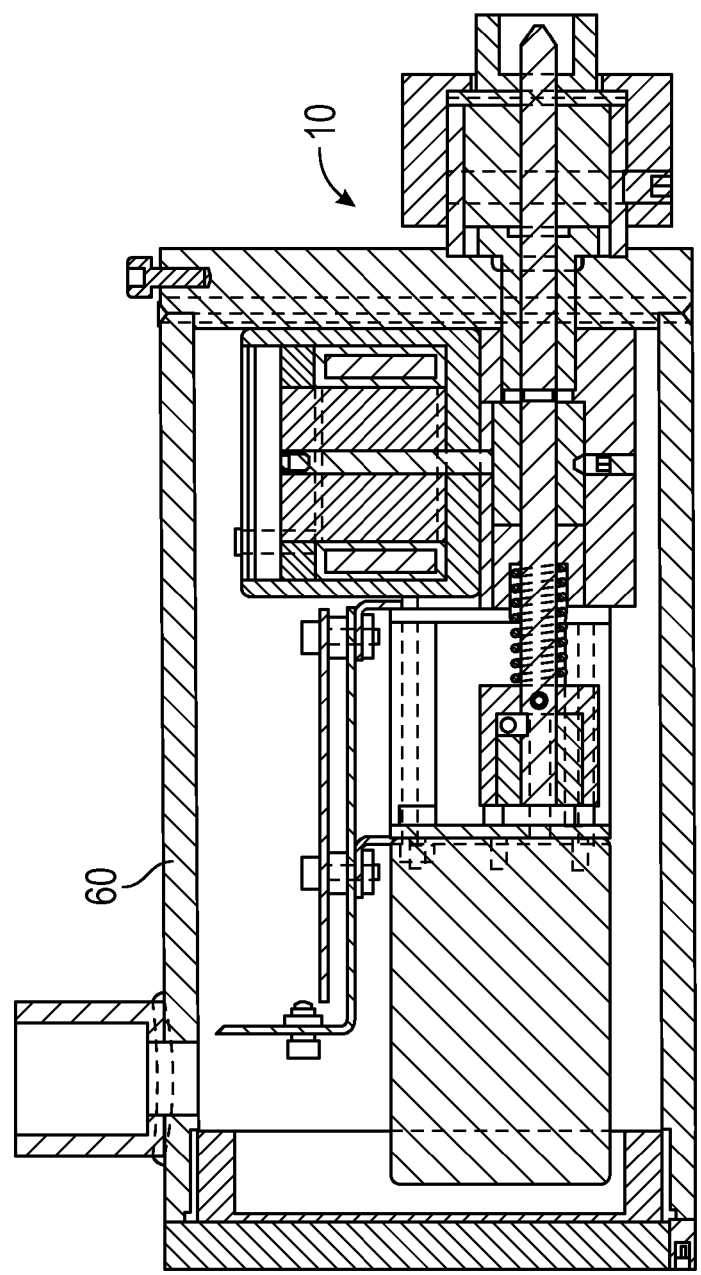
FIG. 7 is a side view of the valve actuator contained within a housing in accordance with embodiments of the present invention.

FIG. 7 shows the valve actuator 10 described in FIGS. 1-6 enclosed within a housing 60. In this example the housing 60 is an "Ex d" enclosure which is explosion proof and flameproof. In other embodiments, the housing may be any suitable housing. Alternatively there may even be no housing if it is not required.

In use, a "push-type" valve actuator 10 as described is provided along with a valve. The valve is initially in a closed, or failsafe, position whereby the flow of fluid through the valve is prevented. The drive shaft 42 of the valve actuator 10 is initially in a retracted, or failsafe, position.

The motor 12 is then energised. Due to the coupling between the motor 12 and the drive shaft 42, the motor causes the drive shaft 42 to rotate freely. At this stage, the drive shaft 42 only moves rotationally.

After the drive shaft 42 has started rotating, the solenoid 52 is energised. Alternatively, the solenoid is energised at the same time that the motor is energised. In response to the energisation of the solenoid 52, the armature 58 and plunger rod 54 are moved linearly forward to push the upper half shell 22 into contact with the drive shaft 42. The partial internal thread 21 of the upper shell 22 is brought into engagement with the externally threaded portion 44 of the drive shaft 42 (due to them being aligned during assembly of the valve actuator). Such engagement transfers the rotational movement of the drive shaft 42 into axial movement, whereby the drive shaft 42 is moved from the initial retracted position into a final extended position against the return spring 46. In the extended position, the drive shaft 42 moves the valve into the open position, such that fluid flow though the valve is permitted.

Once the valve is open, a position sensor indicates that the full stroke of the drive shaft 42 has been reached, and in response the motor 12 is de-energised. The solenoid 52 however remains energised. For example, the stroke length of the drive shaft may be around 10 mm, therefore once the position sensor indicates that the drive shaft has travelled 10 mm, the motor will be automatically de-energised.

In alternative embodiments, the motor may be automatically de-energised after a pre-determined length of operating time. For example, it may be known that the drive shaft takes 3 seconds to travel to its maximum position, so the motor will be de-energised after 3 seconds has passed.

In other embodiments, the motor may be automatically de-energised after a sensor measuring the current indicates that a pre-determined current limit, such as the stall current of the motor, has been reached. For example, the stall current of the motor may be 1 ampere per minute, therefore once this current has been reached, the motor will be automatically de-energised.

Once the motor 12 has been de-energised, the drive shaft 42 stops rotating, but remains held in the axially extended position due to the engagement between the partial internal thread 21 of the upper shell 22 and the externally threaded portion 44 of the drive shaft 42. The benefit of holding the drive shaft 42 in the extended position on the clutch 50, and thus holding the valve in the open position, is that the clutch 50 uses much less power than the motor 12. In some embodiments, after the motor has been de-energised, the power provided by the clutch can be reduced to the bare minimum to hold the valve open. For example, the energised motor 12 can initially provide 24 Watts of power to rotate the drive shaft and the energised solenoid 52 can initially provide 3 Watts of power to move the plunger rod 54 into contact with the upper shell 22, to cause the drive shaft 42 to move axially. The motor 12 is then de-energised, and the drive shaft 42 is held by the clutch 50. The power provided by the clutch 50 to hold the drive shaft 42 can then be reduced to around 1 Watt or less. Therefore, significant energy savings are made. This may have the advantage of saving costs, and overall providing a more efficient valve actuator.

In the event that power is lost to the solenoid 52, whether manually switched off or automatically switched off, for example in response to a potentially hazardous situation, the armature 58 and plunger rod 54 are moved linearly in the opposite direction, such that the force provided to the upper shell 22 is removed. This causes the partial internal thread 21 of the upper shell 22 to disengage from the externally threaded portion 44 of the drive shaft 42. The shape of the inner surface of the upper shell 22 along with the provision of springs between the upper shell 22 and lower shell 24, helps to ensure that the partial internal thread 21 of the upper shell 22 is completely and fully disengaged from the externally threaded portion 44 of the drive shaft 42. The smaller external diameter of the upper shell 22 provides the required radial clearance to help to further ensure that the partial internal thread 21 of the upper shell 22 is completely and fully disengaged from the externally threaded portion 44 of the drive shaft 42.

Disengagement of the threads allows the return spring 46 to automatically and immediately move the drive shaft 42 from the extended position back into the retracted, or failsafe, position. In response to the retraction of the drive shaft 42, the valve is automatically and immediately closed, thus preventing the flow of fluid through the valve. Therefore, the valve actuator 10 provided not only provides significant power savings, it also provides a fast and reliable failsafe mechanism.

Advantageously, in embodiments of the invention a valve actuator is provided which has a reduced operating power whilst continuing to provide an efficient and automatic failsafe mechanism.

Figure 8:
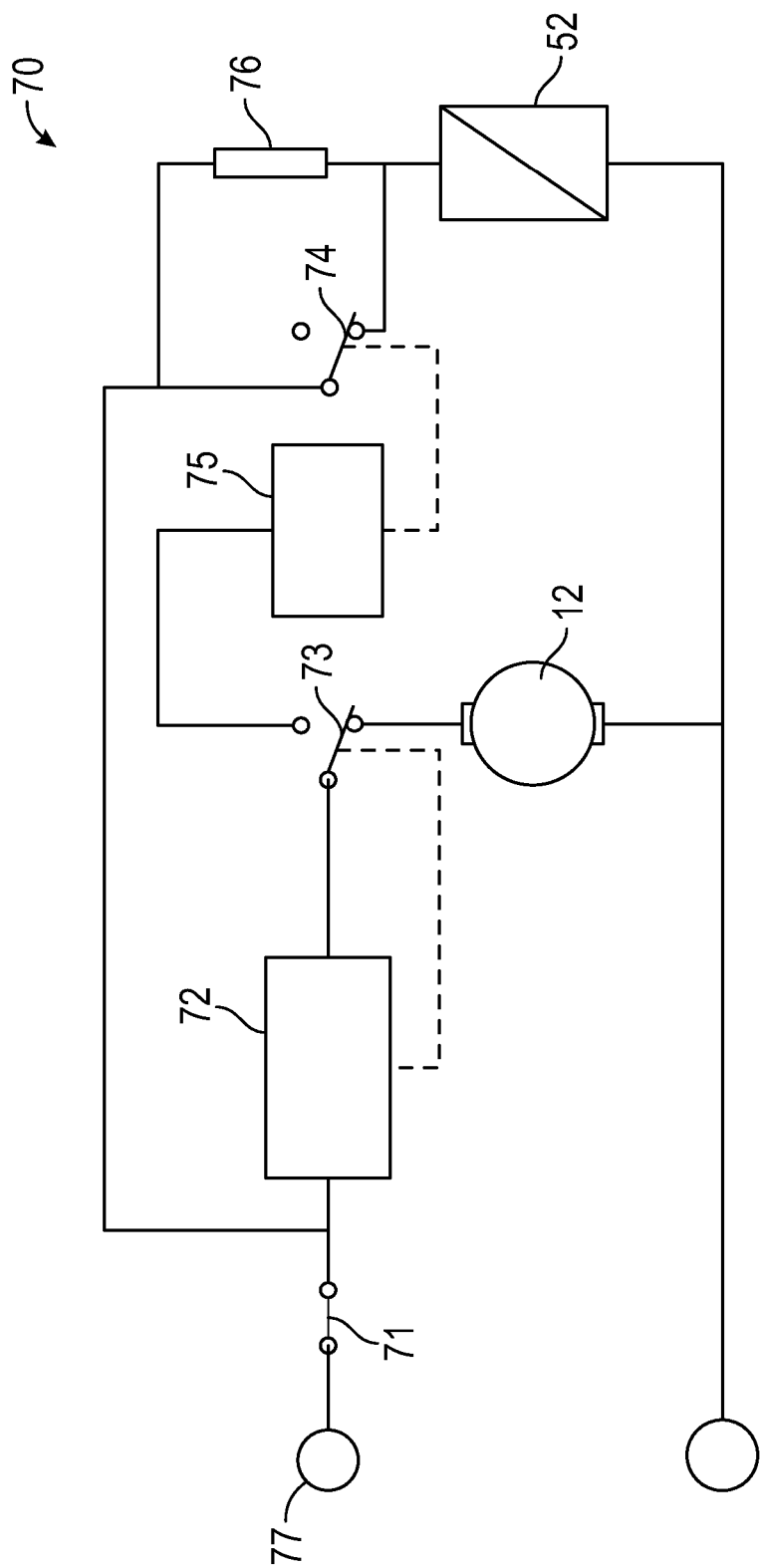
FIG. 8 is a circuit diagram showing how the valve actuator operates in accordance with some embodiments of the present invention.

FIG. 8 shows a simplified circuit diagram 70 for the operation of the valve actuator. In use, a first switch 71 is initially closed. This allows DC power 77 to be supplied to the motor 12 via a current limit circuit 72 and a second switch 73 in the position shown, to activate the motor 12 and cause the drive shaft 42 (shown in FIG. 1) to rotate. Simultaneously, DC power 77 is provided to the solenoid 52 via a third switch 74 in the position shown, to activate the clutch 50 and bring the threaded portion of the upper shell 22 (shown in FIG. 1) into engagement with the threaded portion of the drive shaft 42. The drive shaft 42 can now advance, for example, from the retracted to the extended position (for a "push-type" actuator).

When the drive shaft 42 reaches the end of its stroke, the motor current will increase and cause the current limit circuit 72 to move the second switch such that power is removed from the motor 12. This action triggers a time delay 75 which causes the third switch 74 to move after a predetermined time, thus introducing a series resistor 76 to the circuit. The power applied to the solenoid 52 now first passes through the resistor 76, which in turn reduces the power applied to the solenoid 52.

At this point, the motor 12 is switched off and the upper shell 22 is fully engaged with the drive shaft 42. Due to the power now passing through the resistor 76, the clutch 50 holds the drive shaft 42 in its extended position at a reduced power. This low power holding level is determined by the value of the series resistor 76.

Figure 9:
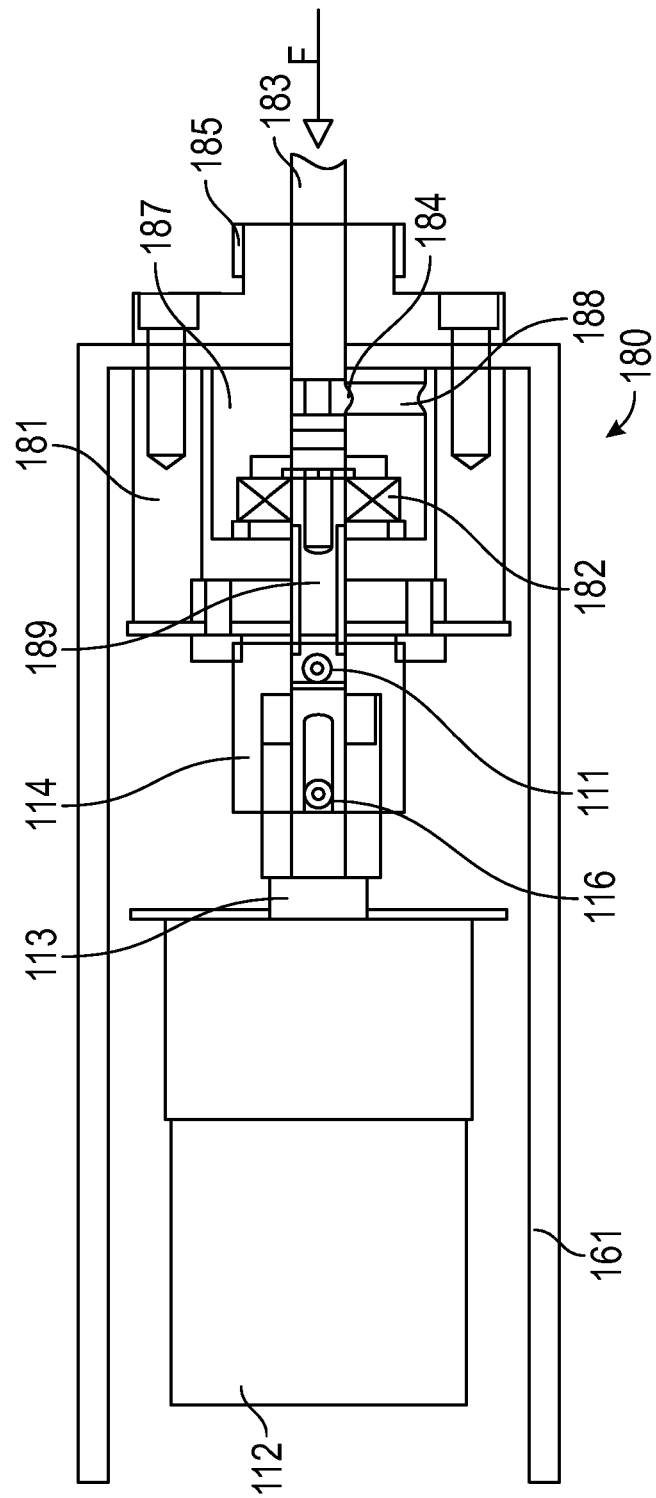
FIG. 9 is a top view of the motor and the coupling between the motor and the drive shaft of the valve actuator in accordance with an alternative embodiment of the present invention.

FIG. 9 shows a top view of an alternative embodiment of the invention, namely a "pull-type" failsafe valve actuator. Features which are the common with FIGS. 1-8 are labelled with the same reference numeral but preceded by a "1", and will not be described again in detail.

In contrast to the "push-type" valve actuator described above, the "pull-type" valve actuator further comprises a pull assembly 180, which comprises support pillars 181, anti-rotation bearings 182, stem 183, stem engagement point 184, and interface 185.

The motor 112 comprises a motor shaft 113 which comprises a drive pin 116 designed to slide into a complementary slot on sliding coupling 114. The sliding coupling 114 is attached to a drive shaft 189 via a pin 11 which extends through an end portion of the sliding coupling 114 and an end portion of the drive shaft 189. In use, when the drive pin 116 is located within the slot, the motor 112 and the drive shaft 189 are coupled, and the drive shaft 189 can rotate when the motor 112 is energised.

The outer surface of drive shaft 189 is coupled to an inner race of the anti-rotation bearings 182. An outer race of the anti-rotation bearings 182 is coupled to an inner surface of a coupling unit 187. The coupling unit 187 comprises a slot 188. The stem 183 is coupled to the coupling unit 187 via the stem engagement point 184 interacting with the slot 188.

The anti-rotation bearings 182 de-couple the stem 183 from the motor 112 to prevent the stem 183 from rotating. The stem 183 is coupled directly or indirectly to a valve (not shown), therefore de-coupling the stem 183 from the motor 112 also prevents the valve from rotating. The valve in this example requires a pull force to open.

The support pillars 181 attach to the interface 185, coupling the assembly 180 to the valve. The support pillars 181 in this example are also attached to an enclosure 161. In some embodiments, the enclosure may not be required.

The drive shaft 189 comprises an externally threaded portion extending along a portion of the length of the drive shaft 189. A clutch (not shown) comprises an upper shell and a lower shell, and the upper shell comprises a partial internal thread which is aligned with and is complementary to the externally threaded portion of the drive shaft 189.

The "pull-type" valve actuator then continues to work in a similar way to the "push-type" valve actuator.

In use, the drive shaft is initially in an extended position. The motor 112 is then energised, but rotates in the opposite direction to the "push-type" valve actuator. In this example, the force applied by the motor is shown by the arrow F pointing to the left.

When the clutch is energised, the threaded portion of the upper shell is brought into engagement with the threaded portion of the drive shaft 189. This causes the drive shaft 189 to rotate and move to the left. The coupling unit 187 and stem 183 also move to the left, but do not rotate because of the anti-rotation bearings 182. Since the drive shaft is indirectly coupled to the valve, a force directed to the left is also applied to the valve, causing the valve to open.

The "pull-type" valve actuator now works in essentially the same way as the "push-type" valve actuator, but in this case the clutch holds the drive shaft in its retracted position at a reduced power.

In the event that power is lost to a solenoid powering the clutch, the force provided to the upper shell is removed, which causes the internal thread of the upper shell to disengage from the externally threaded portion of the drive shaft 189. Disengagement of the threads allows a return spring (not shown) to automatically and immediately move the drive shaft from the retracted position back into the extended, or failsafe, position. In response to the extension of the drive shaft, the valve is automatically and immediately closed, thus preventing the flow of fluid through the valve. Although the invention has been described above with reference to an exemplary embodiment, it will be appreciated that various changes or modifications may be made without departing from the scope of the invention as defined in the appended claims.

The invention claimed is:

1. A failsafe valve actuator, the valve actuator comprising:
a drive mechanism;
a drive shaft comprising an externally threaded portion extending along at least a portion of the length of the drive shaft,
the drive shaft being coupled to the drive mechanism, such that the drive shaft is rotatable by the drive mechanism when the drive mechanism is energised, and wherein
the drive shaft is further axially moveable between a retracted position and an extended position;
a drive shaft bias member arranged to axially bias the drive shaft into a failsafe position;
a clutch arranged adjacent to the threaded portion of the drive shaft; and comprising at least a partial internal thread complementary to the external thread of the drive shaft,
a clutch actuator coupled to the clutch and arranged to move the clutch between an engaged position in which the clutch engages with the threaded portion of the drive shaft and a disengaged position in which the clutch is disengaged from the drive shaft;
wherein in response to energisation of the clutch actuator the clutch is moved to the engaged position such that threaded engagement between the thread of the drive shaft and clutch transfers rotational movement of the drive shaft by the drive mechanism into axial movement of the drive shaft and holds the drive shaft against the drive shaft bias member when the drive mechanism is inactive;
wherein movement of the clutch to the disengaged position, causes the drive shaft bias member to automatically return the drive shaft to the failsafe position;
wherein the actuator further comprises a clutch body defining a passage extending through the clutch body, the externally threaded portion of the drive shaft extending through the passage;
wherein the clutch comprises a first shell having an arch shaped cross section and a semicircular exterior of a first diameter; and a second shell having an arch shaped cross section and a semicircular exterior of a second diameter and an internal thread defined by a threaded portion on an inner surface;
wherein the first shell and second shell are arranged in the passage concentrically around the at least a portion of the externally threaded portion of the drive shaft; and
wherein the second diameter is smaller than the first diameter.

2. A valve actuator as claimed in claim 1, wherein movement of the clutch to the disengaged position is the result of de-energising of the clutch actuator.

3. A valve actuator as claimed in claim 1, wherein the first shell has a smooth inner surface proximal to the drive shaft.

4. A valve actuator as claimed in claim 1, wherein the clutch actuator is arranged to move the second shell into engagement with the at least a portion of the externally threaded portion of the drive shaft in response to energisation of the clutch actuator, such that the threaded portion of the second shell engages with the threaded portion on the drive shaft to cause the drive shaft to be moved axially from one of the retracted and extended position to the other of the retracted and extended position.

5. A valve actuator as claimed in claim 1, wherein the first and second shells are separated by a clutch bias member, and the clutch actuator is arranged to move the second shell into engagement with the drive shaft against the clutch bias member.

6. A valve actuator as claimed in claim 5, wherein the clutch bias member comprises at least one spring located in corresponding spring pockets in at least one of the first and second shells.

7. A valve actuator as claimed in claim 1, wherein the drive shaft bias member comprises at least one spring arranged to automatically return the drive shaft to one of the retracted and extended position when the clutch disengages from the drive shaft.

8. A valve actuator as claimed in claim 1, wherein the clutch actuator comprises a solenoid having a plunger, the plunger being linearly moveable to move the clutch into engagement with the drive shaft in response to energisation of the solenoid.

9. A valve actuator as claimed in claim 8, wherein the solenoid acts in a direction substantially perpendicular to the axial direction of the drive shaft.

10. A valve actuator as claimed in claim 1, wherein the drive mechanism is automatically de-energised and the drive shaft is held in one of the retracted and extended position against the drive shaft bias member by the clutch after one or more of: a pre-determined length of operating time; a position sensor indicating that the full stroke of the drive shaft has been reached; a sensor measuring the current and indicating that a pre-determined current limit has been reached.

11. A valve actuator as claimed in claim 1, wherein the drive mechanism comprises an electrical motor.

12. A valve actuator as claimed in claim 11, wherein the electrical motor is driven through an adjustable current limited supply, such that when a pre-determined current limit is reached, the motor automatically de-energises and the drive shaft is held in one of the retracted and extended position by the clutch against the drive shaft bias member.

13. A valve actuator as claimed in claim 1, wherein the valve actuator further comprises a drive pin and a sliding coupling for engagement between the drive mechanism and the drive shaft.

14. A valve actuator as claimed in claim 1, wherein the clutch actuator requires less power to hold the drive shaft in one of the retracted and extended position by the clutch compared to the amount of power required to hold the drive shaft in the same position through operation of the drive mechanism.

15. A valve apparatus comprising a valve and a valve actuator, the valve actuator comprising:
  a drive mechanism;
  a drive shaft comprising an externally threaded portion extending along at least a portion of the length of the drive shaft, the drive shaft being coupled to the drive mechanism, such that the drive shaft is rotatable by the drive mechanism when the drive mechanism is energised, and wherein the drive shaft is further axially moveable between a retracted position and an extended position;
  a drive shaft bias member arranged to axially bias the drive shaft into a failsafe position;
  a clutch arranged adjacent to the threaded portion of the drive shaft; and comprising at least a partial internal thread complementary to the external thread of the drive shaft,
  a clutch actuator coupled to the clutch and arranged to move the clutch between an engaged position in which the clutch engages with the threaded portion of the drive shaft and a disengaged position in which the clutch is disengaged from the drive shaft;
  wherein in response to energisation of the clutch actuator the clutch is moved to the engaged position such that threaded engagement between the thread of the drive shaft and clutch transfers rotational movement of the drive shaft by the drive mechanism into axial movement of the drive shaft and holds the drive shaft against the drive shaft bias member when the drive mechanism is inactive; and
  wherein movement of the clutch to the disengaged position, causes the drive shaft bias member to automatically return the drive shaft to the failsafe position;
  wherein the actuator further comprises a clutch body defining a passage extending through the clutch body, the externally threaded portion of the drive shaft extending through the passage;
  wherein the clutch comprises a first shell having an arch shaped cross section and a semicircular exterior of a first diameter; and a second shell having an arch shaped cross section and a semicircular exterior of a second diameter and an internal thread defined by a threaded portion on an inner surface;
  wherein the first shell and second shell are arranged in the passage concentrically around the at least a portion of the externally threaded portion of the drive shaft and wherein the second diameter is smaller than the first diameter.

* * * * *